Feb. 25, 1964

A. J. ALABASTER 3,122,148

DISHWASHER WITH MULTIPLE FILTER MEANS

Filed Dec. 23, 1960

Inventor:
Arthur James Alabaster
By Baldwin & Wight
Attorneys

Feb. 25, 1964 A. J. ALABASTER 3,122,148
DISHWASHER WITH MULTIPLE FILTER MEANS
Filed Dec. 23, 1960 3 Sheets-Sheet 2

Inventor:
Arthur James Alabaster
BY Baldwin & Wight
Attorneys

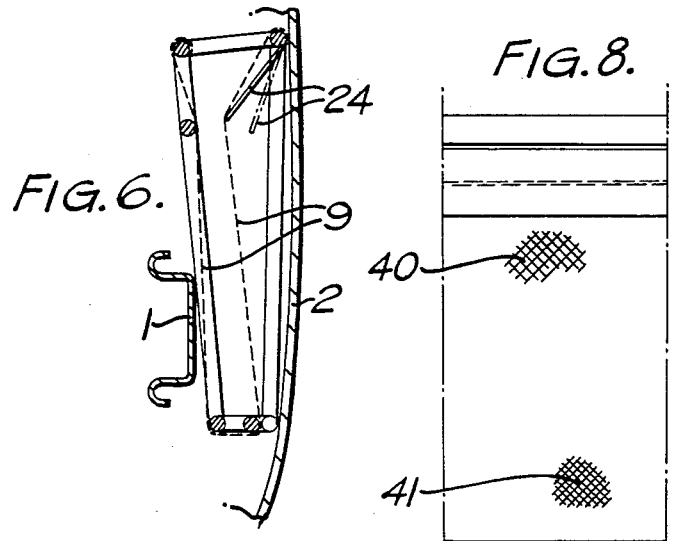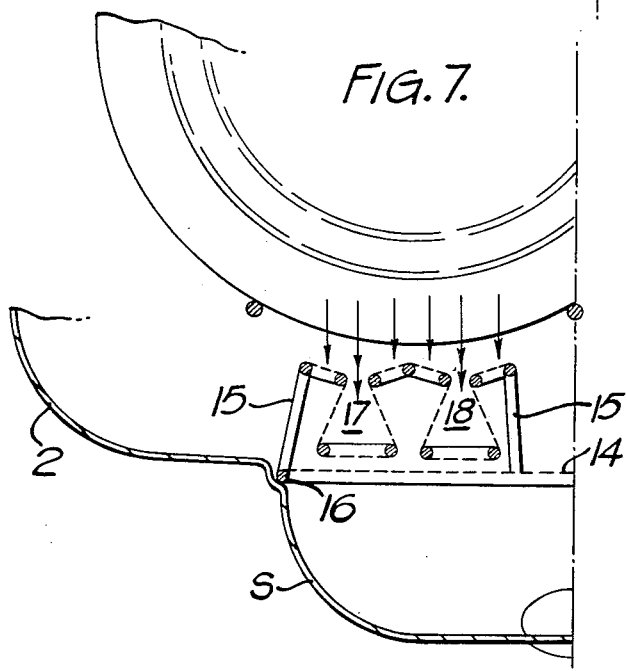

United States Patent Office 3,122,148
Patented Feb. 25, 1964

3,122,148
DISHWASHER WITH MULTIPLE FILTER MEANS
Arthur James Alabaster, Princess Risborough, England, assignor to Charles Colston Limited, London, England, a company of the United Kingdom
Filed Dec. 23, 1960, Ser. No. 78,159
Claims priority, application Great Britain Jan. 13, 1960
12 Claims. (Cl. 134—56)

This invention relates to dishwashing and like machines.

In dishwashers of the kind in which jets or sprays of washing liquid are thrown within an enclosing cabinet against the dishes, glassware, cutlery, etc.: that has to be washed, it is well known that the continued presence of soil in the circulating liquid leads to particles of soil adhering to the washed utensils in the form commonly referred to as "redeposit". It is therefore general practice in such dishwashers to circulate the liquid through a strainer or filter in order to remove as much as possible of the soil from it, the filter being periodically cleaned of accumulated soil particles, usually on completion of a washing operation.

In the applicant's experience certain difficulties attach to the common practice of passing the full flow of liquid through a strainer. If the mesh of the strainer is coarse, particles likely to form redeposit are left in circulation; if the mesh is sufficiently fine to remove all deleterious particles, the filter may be quickly choked and as the differential pressure rises as a result of this choking, the rate of flow will diminish with loss of washing action. Furthermore, particles may be sucked through and returned to circulation.

According to this invention these difficulties are overcome in a simple manner by so arranging construction that while the full flow of liquid passes through a relatively coarse meshed strainer, a proportion of the flow is by-passed through a fine mesh secondary filter.

It is preferred to remove the coarser particles of soil from the partial, or by-pass, liquid stream before it enters the fine mesh strainer and this may be done in one of two ways.

One method is to withdraw the by-pass stream from the main flow after this has passed through the coarse mesh filter. Another and convenient method is to position the by-pass filter at a substantial horizontal distance from the nozzles or holes through which the jets or sprays emerge, so as to allow time and opportunity for the larger and heavier particles to fall out, the larger particles then being removed from the liquid by passage of the latter through the full flow, coarse filter prior to recirculation.

A convenient way of attaining this second method is to position the secondary strainer adjacent to one vertical wall of the washing chamber in such a manner that liquid streaming down that wall is constrained to pass into the fine mesh strainer which is conveniently in the form of a trough or bag.

An alternative method is to divert a minor proportion of the liquid flow from the pressure side of the pump or other circulatory means and to pass this back to the cabinet through the secondary filter which may be in the form of a closed top bag.

In one embodiment of the invention as applied to a washing machine with a horizontally mounted tubular spray element, as for example the machine described in British Patent No. 832,756, and the corresponding co-pending U.S. application of Alfred Henry Wickham and Robert John Gilson, Serial No. 810,883, filed May 4, 1959, now Patent 3,026,046, owned in common with the present application. This machine has a tubular impeller mounted to revolve about a horizontal axis, satisfactory results have been obtained using one, or preferably two pockets or bags of filter mesh material, placed adjacent the bottom of a side wall and extending substantially the entire length of the said side wall.

The bag or bags is or are conveniently made of filter mesh material, e.g., metal wire gauze, cotton or plastic filament cloth, secured to a wire or plastic framework.

The bag or bags are disposed horizontally along the full length of the lower part of one or both of the side walls of the cabinet, these walls being in a plane at right angles to the jets thrown from the tubular impeller and so receiving such liquid as is thrown across and past the crockery and other articles. One lip of a bag is in contact with the side wall while the other lip is spaced away from it, the body of the bag being arranged to hang clear so that liquid can flow through the mesh on all sides while soil collects in the bottom of the bag. The applicant has found that between ⅛ and ⅟₅₀ of the total flow of liquid passes into and through a bag or bags so placed.

In another embodiment of the invention a single filter bag is suspended in a position at one end of the impeller tube to collect liquid from auxiliary spray jets provided to direct liquid sprays directly into it.

The filter material may be of uniform mesh or to minimise the risk of choking, the mesh may be graduated, progressively or in steps, so as to be coarser at the top than at the bottom.

The invention is illustrated in the accompanying drawings in which:

FIGURE 6 shows a further form of filter bag fitted with an automatically-operating self-restricting baffle device;

FIGURE 7 is a sectional view of a main filter with which is associated a secondary filter;

FIGURE 8 is a detail view of a filter bag.

Figure 1:
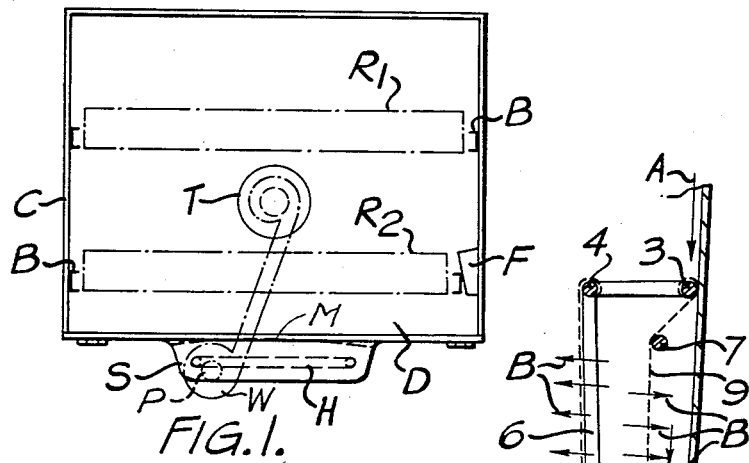
FIGURE 1 is a diagrammatic front view of a dishwashing machine having a front opening door and a horizontal impeller tube fitted with a main filter and a secondary filter in accordance with a preferred embodiment of the invention, the secondary filter consisting of a single wall-mounted bag.

Referring first to FIGURE 1 of the accompanying drawings there is shown a washing cabinet, indicated generally at C, having a front opening door D which, when in the open position as shown, assumes a horizontal position. Inside the washing chamber of the cabinet C is a rack or racks, of which conveniently there are two as shown, the lower one mainly for plates and the upper one for crockery. The two racks indicated respectively at R1, R2 are slidably supported on wall brackets B so that each rack can be pulled forwardly to facilitate stacking articles on a rack. S indicates the sump which contains the heater coil H and in which there is an opening for connection to a water pump W or other means of circulating the washing liquid in the chamber. The water pump W is connected to the sump S by an outlet pipe P, the liquid being recirculated through a return flow pipe leading to a liquid delivering means, as shown a revolving impeller tube T.

Washing of the articles is by means of a spray discharged from the revolving impeller tube T. The impeller is preferably constructed in accordance with the aforementioned U.S. application Serial No. 810,883, but it will be understood that other means of discharging the spray or for throwing the liquid over the articles to be washed may be used. In this design of washing chamber the main filter indicated at M, which consists of a disc of relatively open mesh gauze material, is detachably fitted in the sump so that it is readily accessible and can be lifted out for cleaning.

In operation, the impeller tube T directs cleaning liquid against the articles to be washed with resultant dropping of both relatively large and relatively small soil particles distributed in the cleaning liquid which descends in the washing chamber in dispersed or droplet form. The dispersed liquid, on reaching the bottom of the chamber, consolidates, so to speak, into a body of liquid which flows out through the main filter M and sump S to the pump W.

A secondary filter for use in accordance with this invention is shown at F, within and above the bottom of the chamber, where it is suspended between the side runner for the lower rack and the side wall. In this position, the filter F is above the zone of collection of washing liquid as a body, but is in the path of descent of dispersed liquid. Since the filter F is of relatively small horizontal size as compared to the horizontal extent of the washing chamber, only a part of the descending dispersed liquid encounters and passes through this filter.

Figure 2:
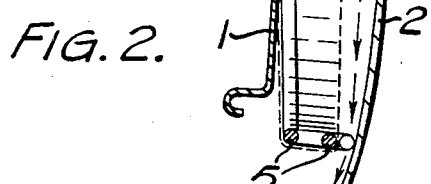
FIGURE 2 is a sectional view on an enlarged scale showing part of the washing chamber of FIGURE 1 fitted with a removable filter bag or pouch in accordance with one embodiment of the invention.

Referring now to FIGURE 2, the filter bag is shown lodged between the cabinet wall and the side runner which consists of a channel section strip 1, it being customary to space this strip away from the cabinet wall in order to allow for free flow of the wash liquid between the side of the rack and the wall.

Figure 3:
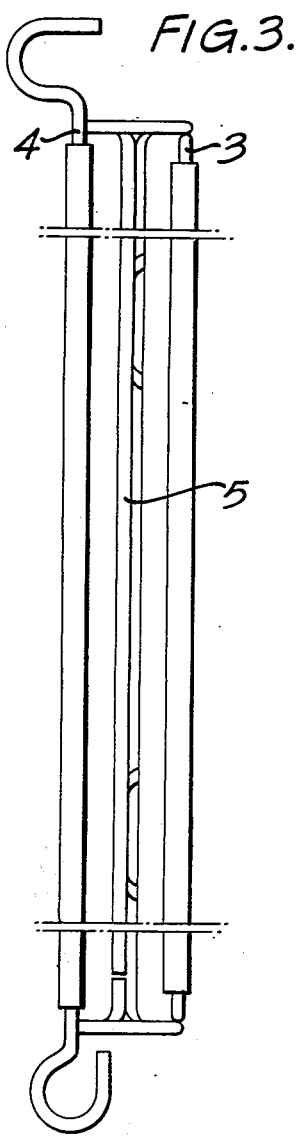
FIGURE 3 is a plan view of the filter bag shown in FIGURE 2.

In the arrangement shown in FIGURES 2 and 3, the secondary filter consists of a bag or pouch of fine mesh material e.g. nylon attached to a wire frame, the bottom and top of which are of rectangular form and comprise elongated side members 3, 4, along its upper side and similar members 5 at the bottom. The side members 3 and 4 are spaced apart so as to provide an open mouth to collect the soiled water. On the innermost side of the washing chamber the upper and lower side members 4, 5 are connected by a straight end member 6 but on the wall side, an additional rib 7 is provided so that the lower portion of the bag, when in position, will be offset from the side wall.

The bag is shown in position in FIGURE 2 and as can be seen therefrom, the mesh material 9 is held away from the vertical side wall 2 of the washing chamber except at the top of the pouch.

As indicated by the arrow A, liquid which strikes the side walls will be directed into the mouth of the bag from which it is free to find its way through both walls as indicated by the arrows B.

In use it has been found that when some detergents and wetting agents are used the open mouthed bags rapidly fill up to the top with foam, the foam then spilling over the top throughout most of the washing cycle. Unfortunately the overspill takes with it a certain amount of the soil, which it is the object of this invention to collect in the pouch. It may not be possible completely to eliminate the foam, partly because some of the ingredients in dishwashing detergents tend to generate foam and even should a completely foamless detergent be used, a certain amount of foam may still occur due to the action of the detergent, which is alkaline, having a saponifying action on the fats in the food soils.

Figure 4:
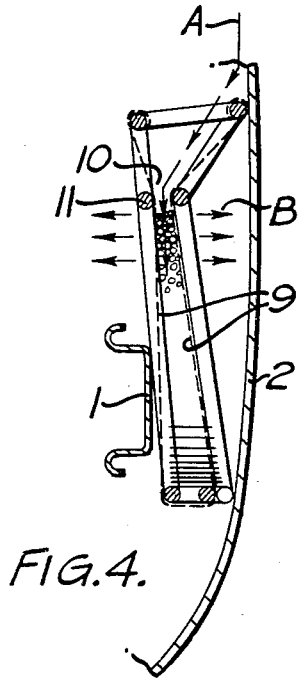
FIGURE 4 is a sectional view similar to FIGURE 3 showing a filter bag having a restricted throat.

In order, therefore, to reduce the tendency to overspill with consequent loss of filtering efficiency, the bag may be provided with a narrow throat as shown at 10 in FIGURE 4. In this arrangement an additional rib 11 is positioned so that the horizontal cross section of the bag is restricted by the additional rib 11 and below the restriction the bag is of increasing cross-section.

This construction has the advantage that soiled liquid will enter the throat but the foam that builds up inside the bag above the level of water that collects within it is restrained from overflowing and is constrained to escape through the mesh.

Figure 5:
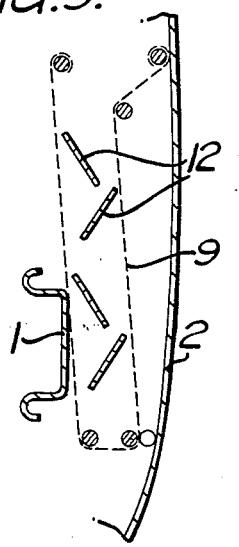
FIGURE 5 is a diagrammatic section showing a filter bag provided with baffles.

An alternative means of minimising the difficulty caused by overspill of foam consists in the provision of baffles within the filter bag restricting the horizontal cross section of the bag below its top. One such arrangement is shown in FIGURE 5 in which a series of baffles 12 is arranged to alternate in opposite directions.

Yet another means of minimising the difficulty caused by foam depends on the use of a thermally sensitive baffle.

When the washing machine is first started up and commences to wash, the water will usually be relatively cool and free from foam, but it will also carry with it the bulk of the soil. It is therefore desirable that at this stage the bag should accept the maximum available incoming flow of water which e.g. might correspond to 10% of the total flow in circulation.

As the soil builds-up and foam slowly accumulates in the bag, there is a tendency, as previously explained, for the foam to overspill, resulting in some of the entrapped soil being carried away with it.

Referring now to FIGURE 6, by fitting a baffle 24 formed of a material which flexes when heated, e.g., of a bi-metal strip, in the open mouth of the filter bag, it is possible to reduce the effective width of the throat as the temperature of the liquid recirculating in the washing chamber builds up to the operating temperature by reason of the heater element H in the sump.

In FIGURE 6, the chain dotted line shows the strip 24 in its inoperative position when the liquid in the washing chamber is cold, the position taken up by the strip when the liquid has been heated to its operating temperature, being shown in full lines.

The effect of this arrangement is that at the start of a washing operation there is a relatively high proportion of by-pass filtering, this gradually being reduced to a smaller figure which might for instance be in the order of 3 to 5% by the time the wash is completed.

FIGURE 8 shows a bag having coarse mesh 40 across its upper part and finer mesh 41 at the bottom.

Instead of locating the filter bags in a position to collect soil from liquid streaming down the side walls of the cabinet, an alternative location is beneath the crockery in the racks. A suitable position for such an arrangement would be to locate them immediately beneath that part of the racks into which items such as dinner plates having a large surface are placed, and where the force of the spray jets is reduced by reason of their striking the plates. One such arrangement is shown in FIGURE 7 wherein the filters are placed above the main or full flow filter indicated at 14 in the sump.

In this construction, bracket arms 15 form part of, or are attached to, the frame 16 of the sump filter and support two bags 17, 18 having a relatively fine mesh.

In this arrangement the filter bags 17, 18 are elongated so that they extend lengthwise of the width of the row of plates in the rack.

Figure 9:
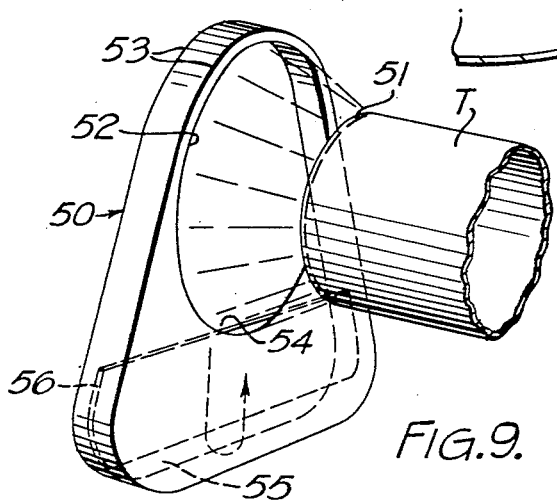
FIGURE 9 is a perspective view of a dishwashing machine having a secondary filter arranged to collect liquid discharged from the forward end of the impeller tube.

Referring now to FIGURE 9 of the drawings, the impeller tube T, which, as shown in FIGURE 1, is mounted to revolve about its longitudinal axis, is supported for rotation about a bearing spindle connected to the rear wall of the washing chamber while its forward end is located opposite the door giving access to the chamber. The secondary filter is in the form of a bag 50 which is arranged to extend along one side wall of the chamber, i.e. parallel to the secondary filter 50 provided with a vertical opening 52. The secondary filter 50 is in the form of a bag, which in use is detachably suspended either from one of the racks, in which articles are placed for washing, or from a fitting on the inside panel of the front door.

In this arrangement the impeller tube T is provided at its forward end with by-pass jet orifices 51 arranged to discharge liquid in a forward direction so that it will enter an opening 52 in one side of the filter bag 50. The filter bag 50 may consist of nylon mesh stretched over a triangular wire frame 53, the bottom portion 55 providing a pocket for the soil containing liquid issuing from the jets 51. 56 is an optional weir, which encourages the incoming liquid to flow downwardly in the direction of the arrows allowing the soil to settle in the bottom of the bag.

The secondary filter bag 50 may be provided with a hook-on type of fixing so that it can be suspended from the rack and if attached to the upper rack, this will ensure that the operator must remove the bag after each wash, since until it has been removed, articles cannot be taken out of the lower rack.

Alternately the bag may be fitted with one component of a drop-in or clip on type fastening, the other component being attached to the inside panel of the front door.

It has been found that, by arranging for those orifices which direct liquid into the bag, to draw off liquid at points which are at a greater radius than the points of off-take of the normal spray jet orifices, a higher concentration of soil in the soil-containing liquid is directed into the filter bag.

An advantage of placing the secondary filter at the front end of the impeller is that it is more readily accessible for cleaning and there is less likelihood of it being forgotten and its contents not being cleaned out regularly.

What is claimed is:

1. A dishwashing machine comprising a washing chamber; rack means in said chamber and on which articles to be washed are placed; liquid delivering means within said chamber and including an elongated spray member having main and auxiliary jet orifices for discharging cleaning liquid, said main jet orifices being positioned along said spray member for spraying cleaning liquid outwardly onto articles placed on said rack means with resultant dropping of relatively large and relatively small soil particles in dispersed cleaning liquid and flowing of descended liquid back to said liquid delivering means and said auxiliary jet orifices being positioned at the end of said spray member to spray liquid in a direction other than that of said main jet orifices; a main filter of relatively coarse mesh positioned in the path of liquid and through which all of said liquid must pass; and a secondary filter of relatively finer mesh mounted within said washing chamber in a position to receive directly the spray issuing from said auxiliary jet orifices and to enable only a part of the liquid which descends in said chamber to pass through said secondary filter.

2. A dishwashing machine comprising a casing having a top, a bottom and substantially vertical walls enclosing a washing chamber in which articles to be washed are placed; liquid delivering means within said chamber for spraying cleaning liquid against said articles with resultant dropping in said chamber of relatively large and relatively small soil particles distributed in dispersed descending liquid and falling of liquid onto said bottom and flowing of said liquid to said liquid delivering means; a main filter element of relatively coarse mesh in the path of said liquid and through which said liquid passes; and a secondary filter of relatively finer mesh mounted in said chamber adjacent a substantially vertical surface within said washing chamber and down which surface may drain into said secondary filter only a portion of the dispersed liquid descending in said chamber.

3. A dishwashing machine comprising a casing having a top, a bottom and substantially vertical walls enclosing a washing chamber in which articles to be washed are placed; liquid delivering means within said chamber for spraying cleaning liquid against said articles with resultant dropping in said chamber of relatively large and relatively small soil particles distributed in dispersed descending liquid and falling of liquid onto said bottom and flowing of said liquid to said liquid delivering means; a main filter element of relatively coarse mesh in the path of said liquid and through which said liquid passes; and a secondary filter of relatively finer mesh mounted in said chamber adjacent a substantially vertical wall portion of said casing and through which may pass only a portion of the dispersed liquid descending in said chamber adjacent said wall portion, and liquid running down said wall portion.

4. A dishwashing machine according to claim 3 in which said secondary filter comprises a bag with an open mouth facing upwardly, the bag having a restricted throat below the open mouth for reducing overspilling of foam.

5. A dishwashing machine according to claim 3 in which said secondary filter comprises an open mouth mesh bag having the major portion of its mesh extending substantially vertically and its open mouth facing upwardly.

6. A dishwashing machine according to claim 5 in which the top edge of one substantially vertical part of said bag is mounted in contact with said wall portion, whereby liquid running down said wall portion will enter said bag.

7. A dishwashing machine according to claim 6 comprising means for offsetting said substantially vertical part of said bag from said wall portion at a level below said mouth, thereby to enable filtered liquid to pass through said vertical part of said bag.

8. A dishwashing machine comprising a casing having side walls enclosing a washing chamber in which articles to be washed are placed; a door in the front wall of the casing giving access to the washing chamber; guides mounted on said side walls; a rack device for articles to be washed supported by said guides to permit movement, when the door is open, of the rack device to a withdrawn position; liquid delivering means within the chamber by which liquid is sprayed over the articles when placed on said rack device with resultant dropping of relatively large and relatively small soil particles distributed in dispersed descending cleaning liquid, said chamber having a bottom on which said liquid falls and collects as a body of liquid; a sump in the chamber to receive liquid from said chamber bottom; a main filter element in said sump and being of relatively coarse mesh through which all of the liquid collected on said bottom must pass; means by which liquid, after passage through the said main filter, is returned to the liquid delivering means for recirculation; a secondary filter element comprising an open mouth bag of relatively finer mesh; and means detachably suspending said bag on one of said guides and within said chamber above said bottom, above the zone of collection of said liquid as a body and in a part of the path of travel of dispersed liquid to the chamber bottom, said bag being of such size that only a part of the dispersed liquid encounters and passes therethrough.

9. A dishwashing machine comprising a casing having side walls enclosing a washing chamber in which articles to be washed are placed; a door in the front wall of the casing giving access to the washing chamber; liquid delivering means within the chamber by which liquid is sprayed over the articles when placed therein with resultant dropping of relatively large and relatively small soil particles distributed in dispersed descending cleaning liquid, said chamber having a bottom on which said liquid falls and collects as a body of liquid; a sump in the chamber to receive liquid from said chamber bottom; a main filter element in said sump and being of relatively coarse mesh through which all of the liquid collected on said bottom must pass; means by which liquid, after passage through the said main filter is returned to the liquid delivering means for recirculation; a secondary filter element of relatively finer mesh comprising a single bag of substantially rectangular shape in plan and having a substantial area of its mesh in a nearly vertical plane; and means mounting said bag within said chamber above said bottom, above the zone of collection of said liquid as a body, in a part of the path of travel of dispersed liquid to the chamber bottom and with one of the longer sides of said bag in contact with a side wall of said container, said bag being of such size that only a part of the dispersed liquid encounters and passes through said bag.

10. A dishwashing machine as claimed in claim 9, in which the filter bag has a frame so shaped that the mesh material on its wall side is offset from the wall to permit filtered liquid to pass through the mesh on both sides.

11. A dishwashing machine comprising a casing having side walls enclosing a washing chamber in which articles to be washed are placed; a door in the front wall of the casing giving access to the washing chamber; liquid delivering means within the chamber by which liquid is sprayed over the articles when placed therein with resultant dropping of relatively large and relatively small soil particles distributed in dispersed descending cleaning liquid, said chamber having a bottom on which said liquid falls and collects as a body of liquid; a sump in the chamber to receive liquid from said chamber bottom; a main filter element in said sump and being of relatively coarse mesh through which all of the liquid collected on said bottom must pass; means by which liquid, after passage through the said main filter is returned to the liquid delivering means; a secondary filter element of relatively finer mesh comprising an open mouth bag; means mounting said bag within said chamber above said bottom, above the zone of collection of said liquid as a body and in a part of the path of travel of dispersed liquid to the chamber bottom, said bag being of such size that only a part of the dispersed liquid encounters and passes through said bag; and a strip of thermo-responsive material engaging the mouth of said bag for automatically reducing the area of the bag inlet opening as the temperature of the washing liquid increases.

12. A dishwashing machine comprising a washing chamber; rack means in said chamber and on which articles to be washed are placed; liquid delivering means within said chamber for spraying cleaning liquid onto articles placed on said rack means with resultant dropping of relatively large and relatively small soil particles in dispersed cleaning liquid and flowing of descended liquid back to said liquid delivering means; a main filter of relatively coarse mesh positioned in the path of liquid and through which all of said liquid must pass; and a secondary filter of relatively finer mesh spaced and entirely separated from said rack means and located in a part only of the path of cleaning liquid, whereby only a part of the liquid which descends in said chamber passes through said secondary filter, said secondary filter comprising a mesh bag having portions of its mesh extending substantially vertically, one vertically extending portion of said bag being formed with an opening adjacent its top to enable liquid to flow through said opening to strike the opposite vertically extending portion of said bag.

References Cited in the file of this patent
UNITED STATES PATENTS

| | | |
|---|---|---|
| 1,580,017 | Connor | Apr. 6, 1926 |
| 1,757,278 | Weidman | May 6, 1930 |
| 2,374,755 | Kisch | May 1, 1945 |
| 2,536,087 | Powers et al. | Jan. 2, 1951 |
| 2,638,104 | Wotring | May 12, 1953 |
| 2,657,695 | Walker | Nov. 3, 1953 |
| 2,681,658 | Muker et al. | June 22, 1954 |
| 2,751,917 | Low | June 26, 1956 |
| 2,943,474 | Bochan | July 5, 1960 |
| 3,026,046 | Wickham et al. | Mar. 20, 1962 |

FOREIGN PATENTS

| | | |
|---|---|---|
| 295,048 | Great Britain | May 30, 1929 |